US007023832B2

(12) United States Patent
Ragan et al.

(10) Patent No.: US 7,023,832 B2
(45) **Date of Patent: *Apr. 4, 2006**

(54) PAGING SYSTEM WITH SPACIAL, FREQUENCY AND TIME DIVERSITY

(75) Inventors: Lawrence Ragan, Richardson, TX (US); Garold B. Gaskill, Tualatin, OR (US)

(73) Assignee: Seiko Instruments, Inc., Chiba (JP)

( * ) Notice: Subject to any disclaimer, the term of this patent is extended or adjusted under 35 U.S.C. 154(b) by 530 days.

This patent is subject to a terminal disclaimer.

(21) Appl. No.: 10/193,892

(22) Filed: Jul. 12, 2002

(65) Prior Publication Data

US 2003/0007477 A1 Jan. 9, 2003

Related U.S. Application Data

(63) Continuation of application No. 08/353,572, filed on Dec. 9, 1994, now Pat. No. 6,433,668, which is a continuation of application No. 07/971,693, filed on Nov. 4, 1992, now abandoned, which is a continuation of application No. 07/529,011, filed on May 25, 1990, now abandoned, which is a continuation-in-part of application No. 07/568,932, filed on Aug. 17, 1990, now Pat. No. 5,168,271, which is a continuation of application No. 07/326,491, filed on Mar. 17, 1989, now abandoned, which is a continuation of application No. 07/101,252, filed on Sep. 25, 1987, now abandoned, which is a continuation-in-part of application No. 06/802,844, filed on Nov. 27, 1985, now Pat. No. 4,713,808, application No. 10/193,892, which is a continuation-in-part of application No. 07/981,968, filed on Nov. 25, 1992, now Pat. No. 5,552,779.

(51) Int. Cl.
*H04Q 7/14* (2006.01)

(52) U.S. Cl. ...................... 370/345; 370/311; 370/330; 340/7.27; 340/7.42; 340/7.43

(58) Field of Classification Search ................ 370/345, 370/458, 311, 330; 340/7.2, 7.27, 7.42, 7.43; 455/455; 375/267; 714/777
See application file for complete search history.

(56) References Cited

U.S. PATENT DOCUMENTS

| | | | |
|---|---|---|---|
| 3,836,726 A | 9/1974 | Wells | |
| 3,842,352 A | 10/1974 | Cote | |
| 3,978,408 A * | 8/1976 | Gupta et al. | 375/267 |
| 4,001,692 A | 1/1977 | Fenwick | |
| 4,074,230 A * | 2/1978 | Icenbice, Jr. | 714/777 |
| 4,086,537 A | 4/1978 | Asakawa | |
| 4,354,260 A | 10/1982 | Planzo | |
| 4,363,132 A | 12/1982 | Collin | |
| 4,392,135 A | 7/1983 | Ohyagi | |
| 4,398,192 A | 8/1983 | Moore | |

(Continued)

*Primary Examiner*—Edwin C. Holloway, III
(74) *Attorney, Agent, or Firm*—Marger, Johnson & McCollom PC

(57) ABSTRACT

A highly reliable radio paging system with a combination of time, frequency and spacial diversity in order to increase the reliability of the system. Time diversity is provided by broadcasting the same message at a number of different times. Spacial diversity is achieved by broadcasting the same message from a number of different locations. Frequency diversity is achieved by broadcasting the same message at a number of different frequencies. The paging receiver is designed to receive messages on a number of different frequencies; however, the pager only responds to a message the first time that it receives the particular message. The combination of time, frequency, and spacial diversity provide a highly reliable radio paging system.

12 Claims, 4 Drawing Sheets

U.S. PATENT DOCUMENTS

| | | | |
|---|---|---|---|
| 4,412,217 | A | 10/1983 | Willard |
| 4,419,668 | A | 12/1983 | Ganncheau |
| 4,551,855 | A | 11/1985 | Kurosaki |
| 4,564,935 | A | 1/1986 | Kapan |
| 4,644,347 | A | 2/1987 | Lucas |
| 4,644,351 | A | 2/1987 | Zabaraky |
| 4,658,416 | A | 4/1987 | Tanaka |
| 4,679,225 | A | 7/1987 | Higashiyama |
| 4,713,808 | A | 12/1987 | Gaskill |
| 4,718,109 | A | 1/1988 | Breeden |
| 4,736,461 | A | 4/1988 | Kawasaki |
| 4,741,049 | A | 4/1988 | Reynders |
| 4,747,101 | A | 5/1988 | Yukitsma |
| 4,748,681 | A | 5/1988 | Schmidt |
| 4,755,816 | A | 7/1988 | DeLuca |
| 4,779,262 | A | 10/1988 | Avis |
| 4,792,948 | A | 12/1988 | Matsuo |
| 4,839,639 | A | 6/1989 | Sato |
| 4,850,032 | A | 7/1989 | Freeburg |
| 4,914,649 | A | 4/1990 | Schwendeman |
| 5,150,954 | A | 9/1992 | Hoff |
| 5,168,271 | A | 12/1992 | Hoff |
| 5,552,779 | A | 9/1996 | Gaskill |
| 6,433,668 | B1 | 8/2002 | Ragan |

* cited by examiner

Transmitter A: offset ZERO

Transmitter B: offset ONE (1047 time slot offset)

Transmitter C: offset TWO (2 times 1047 time slot offset)

(Station Offset)

PAGING SYSTEM WITH SPACIAL, FREQUENCY AND TIME DIVERSITY

RELATED PATENT APPLICATIONS

1) The present application is a continuation of application Ser. No. 08/353,572 filed Dec. 9, 1994, now U.S. Pat. No. 6,433,668 which is a continuation of:

2) application Ser. No. 07/971,693 filed Nov. 4, 1992, now abandoned, which is a continuation of:

3) application Ser. No. 07/529,011 filed May 25, 1990, Now abandoned which was a continuation in part of:

4) application Ser. No. 07/568,932 filed Aug. 17, 1990, now U.S. Pat. No. 5,168,271 which was a continuation of:

5) application Ser. No. 07/326,491 filed Mar. 17, 1989, now abandoned which in turn is continuation of:

6) application Ser. No. 07/101,252 filed Sep. 25, 1987, now abandoned which is a continuation in part of:

7) application Ser. No. 06/802,844 which was filed Nov. 27, 1985, now U.S. Pat. No. 4,713,808 and which is now issued as U.S. Pat. No. 4,713,808.

8) This application is also a continuation in part of application Ser. No. 07/981,968 filed Nov. 25, 1992, now U.S. Pat. No. 5,552,779. Priority of the above listed application is claimed

FIELD OF THE INVENTION

The present invention relates to radio paging systems and more particularly to a highly reliable radio paging system.

BACKGROUND OF THE INVENTION

A variety of different types of radio paging systems are in widespread use. For example, a radio paging system that uses a variation of the well known POCSAG protocol is shown in U.S. Pat. No. 4,398,192 (Moore) and a system that broadcast messages using an FM sub-carrier is shown in U.S. Pat. No. 4,713,808 (Gaskill).

None of the know systems is absolutely reliable, that is, none of the known systems can guarantee that one hundred percent of the messages transmitted will be received by the intended receiver. Problems associated with message reception reliability are accentuated when the size of the receivers is decreased. For example, the wristwatch like receiver shown in U.S. Pat. No. 4,7113,808 (Gaskill) imposes sever restrictions on battery size and on the antenna, thereby creating sensitivity or message completion reliability problems.

SUMMARY OF THE INVENTION

The present invention provides a highly reliable radio paging system. The radio paging system of the present invention provides a combination of time, frequency and spacial diversity in order to increase the reliability of the system. Time diversity is provided by broadcasting the same message at a number of different times. Spacial diversity is achieved by broadcasting the same message from a number of different locations. Frequency diversity is achieved by broadcasting the same message at a number of different frequencies. The paging receiver according to the present invention is designed to receive messages on a number of different frequencies; however, the pager only responds to a message the first time that it receives the particular message. The combination of time, frequency, and spacial diversity provided by the present invention results in a highly reliable radio paging system.

DETAILED DESCRIPTION OF PREFERRED EMBODIMENT

Figure 1:
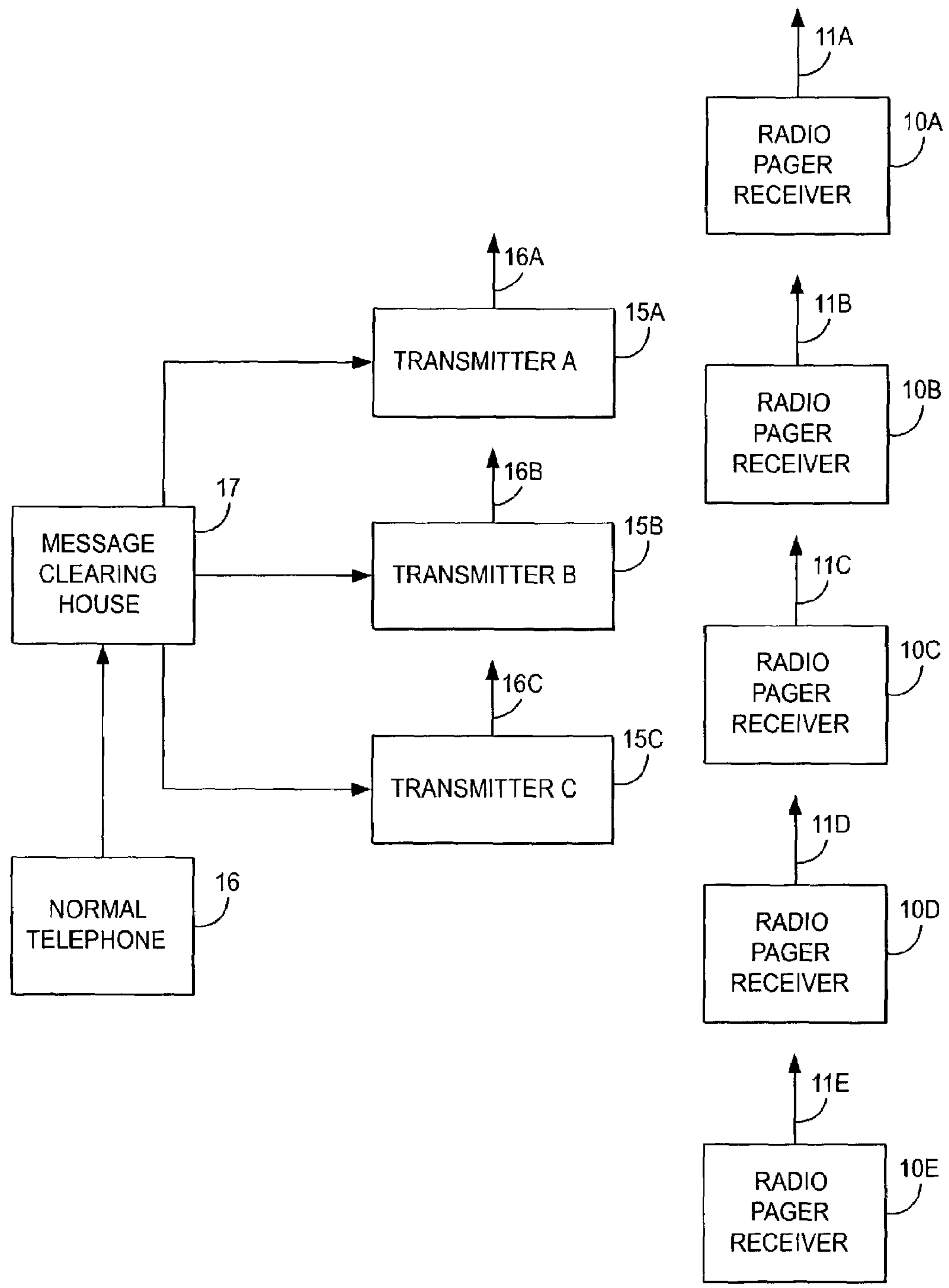
FIG. 1 is an overall block diagram of the system.

The embodiment of the invention shown herein is an extension of the system shown in application Ser. No. 06/802,844 filed Nov. 15, 1987 (now U.S. Pat. No. 4,713,808 (Gaskill). The overall system as shown in FIG. 1 of this application includes three radio transmitters 15A, 15B and 15C and a number of individually addressable radio pagers 10. Messages for the pagers 10 are sent from a normal telephone 16 to a message clearinghouse 17 and then to transmitters 15. The messages are transmitted by radio from transmitter antennas 16 to receiver antenna 15. As will be explained, each receiver only responds to messages that are intended for the particular receiver.

For convenience of illustration, only five individually addressable radio pagers 10A to 10E are shown in FIG. 1; however, it should be understood that a system could include many thousand such receivers.

Each of the radio transmitters 15 is a conventional FM broadcast transmitter. The transmitters 15 broadcast both conventional FM radio programming and pager messages as an FM sub-carrier using the technique described in U.S. Pat. No. 4,713,808. Each of the transmitters 15A, 15B and 15V operates at a different frequency and is at a different physical location as if often the case where there are multiple commercial FM stations in an area. The system operates according to a time slot protocol as described in U.S. Pat. No. 4,713,808. The description from U.S. Pat. No. 4,713,808 is hereby incorporated herein by reference.

The paging receivers 10 are frequency agile and they can receive messages from any one of the stations 15A, 15B or 15C. Each receiver 10 has an assigned time slot and each receiver initially tunes to one of the stations 15A. 15B or 15C. If a receiver does not receive a packet in its assigned time slot the receiver automatically tunes to the next station. It is noted that a receiver may receive a packet in its assigned time slot and the packet may not contain a message directed to the particular receiver. In this case the receiver will not tune to the next transmitter since by receiving a packet which does not contain a message the receiver knows that a message has not been missed. A receiver will tune to the next station when it tries to receive a packet in its assigned time slot and no packet is received. In this case a message may have been missed and the receiver tunes to the next station.

All of the messages being sent to the individually addressable paging receivers 10 are broadcast on each of the transmitters 15A, 15B and 15C. Thus, each message is broadcast from three different transmitters. While each of the three stations broadcasts the same set of messages, the transmissions are offset in time thereby providing the system with time diversity.

The three radio transmitters 15A, 15B and 15C are located at different physical locations, thereby providing the system with spacial diversity. Each of the transmitters 15A, 15B and 15C operates at a different frequency, thereby providing the system with frequency diversity.

Figure 2:
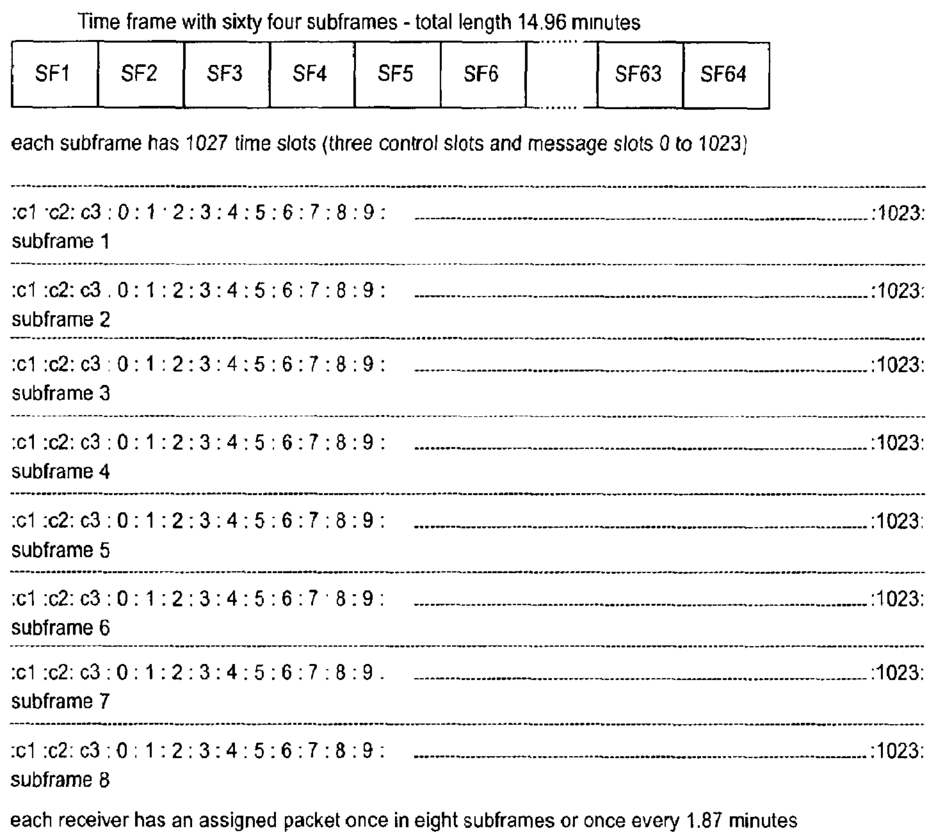
FIG. 2 shows how the system divides time into frames, subframes and time slots.

The manner in which the system divides time into frames and subframes is shown in FIG. 2. Time is divided into repetitive frames and each frame is divided into sixty four sub-frames. Each sub-frame is in turn divided into 1027 time slots. Three of the time slots designated C1, C2 and C3 in each sub-frame are used to transmit control information and time slots 0 to 1023 are used for messages. Each individually addressable pager is assigned or associated with certain particular time slots. More particularly each pager is assigned eight time slots in each frame or one time slot every eight subframes. During normal operation, each pager is inactive (i.e. in a low power state) except during the time periods when its associated time slots occurs. Periodically the receiver is also active when the control slots occur. Thus, the receivers are generally in a low power state and they are only activated for a short period eight times during each frame. The total length of a frame is 14.96 minutes, hence, in normal operation each pager is activated once every 1.87 minutes.

Figure 3:
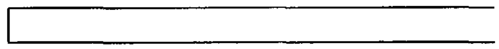
FIG. 3 shows how the transmissions from the stations are offset in time.
Figure 3:
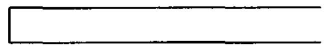

FIG. 3 shows how the time frames in each of the three stations are offset. One offset is 1047 time slots long. Thus, there are sixty four possible offsets. The sixty fourth and the first offset are only separated by 19 time slots, hence either the first or the last offset is not normally used. The offset length was chosen because each receiver 10 can at most handle seven stations and if a receiver did have a list of seven stations, the offsets would be relatively evenly spaced.

Figure 4:
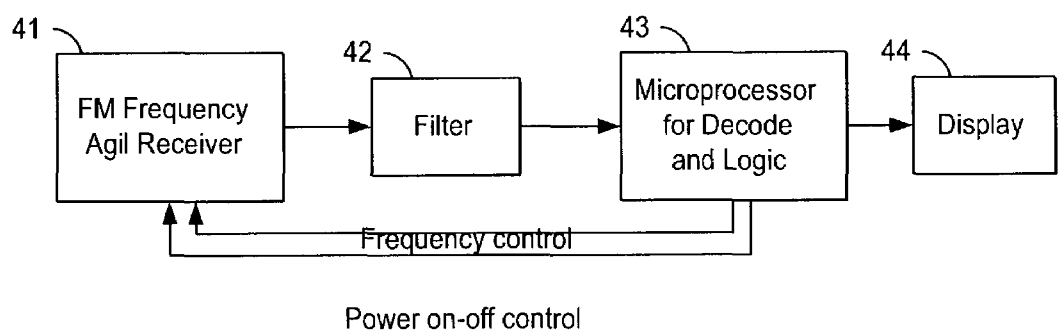
FIG. 4 is a block diagram of one of the radio pagers shown in FIG. 1.

An overall block diagram of the individually addressable radio pagers 10 is shown in FIG. 4. The major components of the receiver are a frequency agile FM radio receiver 41, a filter 42 a microprocessor 43 and a display 44. Receiver 41 receives the signal and generates a base-band audio signal. Filter 42 extracts the data signal from the base band audio generated by receiver 41. Microprocessor 43 decodes the packets, controls the frequency and power or "on-off" of receiver 41. Microprocessor 43 also controls display 44. Time keeping apparatus is also included, but it is not shown in FIG. 4 since it is not particularly relevant to the present invention. Additional detail concerning the structure and operation of receivers 10 is shown in issued U.S. Pat. No. 5,136,719 (Gaskill), U.S. Pat. No. 5,187,470 (King) U.S. Pat. No. 4,999,516 (Suter), U.S. Pat. No. 4,897,835 (Gaskill), U.S. Pat. No. 4,893,341 (Gehring) and U.S. Pat. No. 4,885,802 (Ragan), the description from which is hereby incorporated herein by reference.

Figure 5:
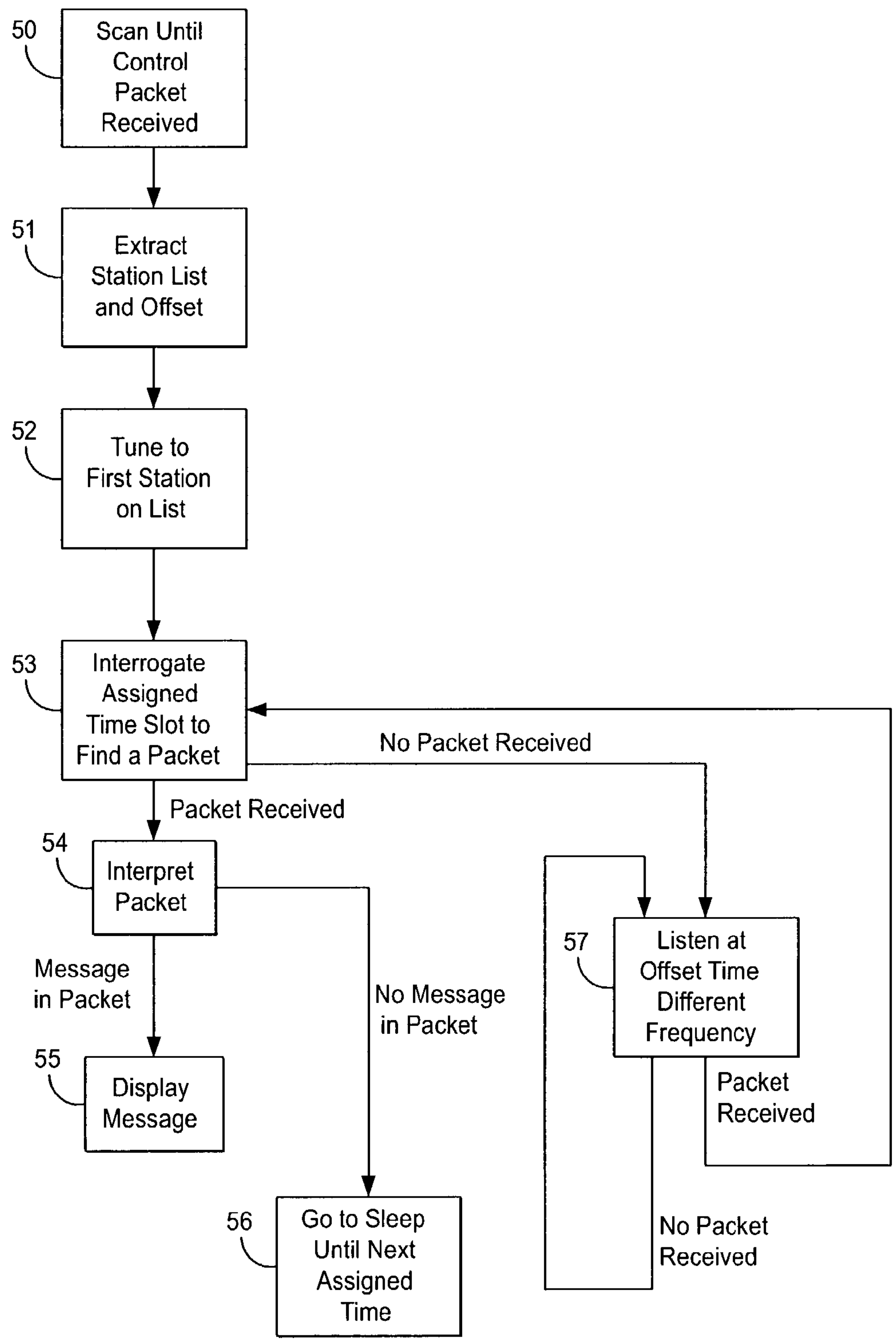
FIG. 5 is a flow diagram of the operation of one of the radio pagers.

The overall operation of the system is shown diagrammatically in FIG. 5. Initially a receiver 10 scans the frequency spectrum until it locks onto a station (block 50). As explained in detail in the previously referenced co-pending applications, once a receiver locks onto a station it extracts a station list (block 51) from the control packets. The station lists gives the frequency of the stations in the local area and the time offset of each station. After receiving a station list the receiver tunes to the first station on the list of stations and it turns off until its assigned time slot occurs. As illustrated by box 55, during its assigned time slot the receiver attempts to receive a message packet. If a packet is received (block 55) the receiver decodes the packet to determine if the packet has a message with the ID number of the particular receiver. If the packet contains a message, the message is displayed (box 55). If no message is received the receiver is deactivated (box 56) until the next assigned time slot.

If a receiver does not receive a packet in its assigned time slot (box 56) the receiver changes frequency and offset and listens to a different station. The process then repeats.

A more detailed description of the operation of the receiver is given in the previously referenced patents and patent applications.

While the invention has been described with reference to preferred embodiments thereof, it will be understood by those skilled in the art that various changes in form and details may be made without departing from the scope of the invention.

The invention claimed is:

1. A message transmission system comprising in combination, a plurality of transmitters, the signals from which, at least in part, are transmitted to a particular local area, each of said transmitters operating at a different frequency, said transmitters transmitting messages according to a time slot protocol, each of said transmitters transmitting the same message multiple times in a time offset fashion, a plurality of addressable radio receivers, located is said particular local area, said receivers being frequency agile and operating according to said time slot protocol, each receiver having an assigned time slot, each receiver being first set to the frequency of one of said transmitters and switching to the frequency of a second one of said transmitters if a message packet is not received in the receiver's assigned time slot, whereby said transmission system has time, and frequency diversity.

2. The system recited in claim 1 wherein said messages are transmitted on an FM sub-carrier.

3. The system recited in claim 1 wherein said transmitters are at different physical locations, thereby providing spacial diversity.

4. The system recited in claim 1 wherein each message is sent repeatedly at different times.

5. The system recited in claim 1 wherein said time slot protocol includes repeating frames each of which have 64 sub-frames and wherein each of said sub-frames has 1027 time slots.

6. A system for transmitting the same message multiple times from a transmitter system transmitting messages to a particular local area and to a receiving device located in said particular local area comprising, means for providing spacial diversity in the transmission paths between said transmitter system and said receiver, for different transmissions of said message in said particular local area, means for providing time diversity in the transmission path between said transmitter system and said receiver, for different transmissions of said message in said particular local area, means for providing frequency diversity in a transmission path between said transmitter system and said receiver, for different transmissions of said message in said particular local area, whereby highly reliable transmissions are possible between said transmitter system and said receiver system.

7. The system recited in claim 6 whereby said messages are transmitted on an FM sub-carrier.

8. The system recited in claim 6 wherein said system operates according to a time slot protocol.

9. The system recited in claim 6 wherein said system operates according to a time slot protocol that includes repeating frames each of which has 64 sub-frames and wherein each of said sub-frames has 1027 time slots.

10. The system recited in claim 6 wherein said messages are transmitted on an FM sub-carrier and said system operates according to a time slot protocol that includes repeating frames each of which has 64 sub-frames and wherein each of said sub-frames has 1027 time slots.

11. A system for sending the same messages multiple times from a transmitter system to a receiving device, both located in a local area, said, system comprising, means for providing spacial diversity in the transmission path between said transmitter system and said receiver, by having a plurality of transmitters at different physical locations in said local area, each of which transmit the same messages, means for providing time diversity in the transmission path between said transmitter system and said receiver, by transmitting each message a plurality of times in a time offset fashion, and means for providing frequency diversity in the transmission path between said transmitter system and said receiver, by having each of said transmitters operating at a different frequency, whereby highly reliable transmissions are possible between said transmitter system and said receiver system.

12. The system recited in claim 11 wherein said messages are transmitted using FM sub-carrier.

* * * * *